United States Patent
Masaoka et al.

(10) Patent No.: US 9,643,890 B2
(45) Date of Patent: May 9, 2017

(54) DIELECTRIC COMPOSITION AND ELECTRONIC COMPONENT

(71) Applicant: TDK CORPORATION, Tokyo (JP)

(72) Inventors: Raitarou Masaoka, Tokyo (JP); Toshihiko Kaneko, Tokyo (JP); Yuki Yamashita, Tokyo (JP); Hiroki Uchiyama, Tokyo (JP); Saori Takeda, Tokyo (JP); Yuji Sezai, Tokyo (JP); Shirou Ootsuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/661,881

(22) Filed: Mar. 18, 2015

(65) Prior Publication Data

US 2015/0274600 A1  Oct. 1, 2015

(30) Foreign Application Priority Data

Mar. 28, 2014 (JP) .................. 2014-068513
Dec. 4, 2014 (JP) .................. 2014-245701

(51) Int. Cl.
*C04B 35/48* (2006.01)
*C04B 35/49* (2006.01)
(Continued)

(52) U.S. Cl.
CPC .............. *C04B 35/49* (2013.01); *C04B 35/47* (2013.01); *C04B 35/48* (2013.01); *C04B 35/486* (2013.01);
(Continued)

(58) Field of Classification Search
CPC .......... C04B 35/47; C04B 35/48; C04B 35/49; H01B 3/12
See application file for complete search history.

(56) References Cited

U.S. PATENT DOCUMENTS 6,329,311 B1 * 12/2001 Fujii .................... C04B 35/486
361/321.4
6,790,801 B2 * 9/2004 Kim ....................... B32B 18/00
361/321.4
(Continued)

FOREIGN PATENT DOCUMENTS

EP      978853    * 2/2000
JP      63298911  * 12/1988
(Continued)

OTHER PUBLICATIONS

Yu et al., "Preparation and characterization of sol-gel derived CaZrO3 dielectric thin films for high-k applications," Physica B, vol. 348, pp. 440-445, 2004.
(Continued)

*Primary Examiner* — Karl Group
(74) *Attorney, Agent, or Firm* — Oliff PLC (57) ABSTRACT

A dielectric composition contains major components that are an A-group containing major components that are at least two selected from the group consisting of Ba, Ca, and Sr and a B-group which contains a major component that is selected from Zr and Ti and which contains at least Zr. The dielectric composition contains an amorphous substance containing the A-group and the B-group and a crystalline substance containing the A-group and the B-group. In the dielectric composition, the inequality $0.5 \leq \alpha \leq 1.5$ holds, where $\alpha$ is the molar ratio of the A-group to the B-group.

4 Claims, 2 Drawing Sheets

(51) Int. Cl.
*C04B 35/465* (2006.01)
*H01B 3/12* (2006.01)
*C04B 35/47* (2006.01)
*C04B 35/486* (2006.01)
*C04B 35/638* (2006.01)

(52) U.S. Cl.
CPC ............ *C04B 35/638* (2013.01); *H01B 3/12* (2013.01); *C04B 2235/3208* (2013.01); *C04B 2235/3213* (2013.01); *C04B 2235/3215* (2013.01); *C04B 2235/6562* (2013.01); *C04B 2235/79* (2013.01); *C04B 2235/80* (2013.01)

(56) References Cited

U.S. PATENT DOCUMENTS

| | | | | |
|---|---|---|---|---|
| 6,858,554 | B2* | 2/2005 | Moon | B32B 18/00 361/321.4 |
| 2004/0145856 | A1 | 7/2004 | Nakamura et al. | |
| 2004/0176238 | A1* | 9/2004 | Ito | B32B 18/00 501/136 |
| 2016/0002114 | A1* | 1/2016 | Goto | C04B 35/49 501/136 |

FOREIGN PATENT DOCUMENTS

| | | | |
|---|---|---|---|
| JP | 2000173349 | * | 6/2000 |
| JP | 2004292173 | * | 10/2004 |
| JP | 2007119275 | * | 5/2007 |
| JP | 2008-258555 A | | 10/2008 |
| JP | 2013112569 | * | 6/2013 |
| WO | 2014156409 | * | 10/2014 |

OTHER PUBLICATIONS

Sep. 8, 2015 Extended Search Report in European Patent Application No. 15159883.6.

Chen et al., "Effects of sintering time on crystal structure, dielectric properties and conductivity of (CA0.8Sr0.2)ZrO3 ceramics", J Mater Sci: Mater Electron, 2014, vol. 25, pp. 1505-1511.

Chen et al., "Metallo-organic decomposition derived Ca, Sr)ZrO3 dielectric thin films on Pt coated Si substrate", Applied Surface Science, (2006), vol. 252, pp. 7585-7589.

Yu et al., "Preparation of sol-gel-derived Ca1-xSrxZrO3 perovskite dielectric thin films", J Electroceram, (2007), vol. 18, pp. 149-154.

Joseph et al., "Structural Investigations on the (Ba,Sr)(Zr, Ti)O3 System," J. Phys. D: Appl. Phys., vol. 32, pp. 1049-1057, 1999.

* cited by examiner

DIELECTRIC COMPOSITION AND ELECTRONIC COMPONENT

BACKGROUND OF THE INVENTION

1. Field of the Invention

The present invention relates to a dielectric composition and an electronic component.

2. Description of the Related Art

Examples of an electronic component including a dielectric film include thin-film capacitors, thin-film filters for high frequency, and the like. These components are widely used as compact high-performance electronic components and are required to have higher capacitance, a small change in capacitance with a change in temperature, and excellent resistance to high voltage. In recent years, as highly functional devices such as smart phones and notebook personal computers have been further downsized and sophisticated, the electronic components have been strictly required to be more compact and smart.

In order to cope with such requirements, for example, thin-film capacitors including dielectric films with reduced thickness are under development. Reducing the thickness of films allows a capacitor to have increased capacitance and, however, causes a problem in that the resistance to high voltage drops and desired characteristics are not achieved.

In general, for example, amorphous $SiO_x$ films are used, as dielectric films in DRAM capacitors for semiconductor integrated circuits. However, in the case of using amorphous $SiO_x$ in a thin-film capacitor, dielectric films need to be thin in order to achieve higher capacitance because the relative permittivity of amorphous $SiO_x$ is low, 2 to 3. Therefore, a thin-film capacitor containing amorphous $SiO_x$ does not have good resistance to high voltage. Thus, in order to obtain a compact highly functional thin-film capacitor, a dielectric material having high relative permittivity and nigh dielectric strength needs to he used.

For materials with higher relative permittivity, for example, Science direct Physica B 348 (2004) 440-445, Preparation and characterization of sol-gel derived $CaZrO_3$ dielectric thin film for high-k applications (Non Patent Document 1) discloses that a Ca—Zr—O amorphous film is formed by varying post-deposition heat-treatment temperature for a $CaZrO_3$ thin-film. In this document, it is confirmed that the Ca—Zr—O amorphous film has a dielectric strength of about 3.0 MV/cm to 3.5 MV/cm and a relative permittivity of about 18.

Furthermore, Japanese Unexamined Patent Application Publication No. 2008-256555 (Patent Document 1) discloses that defects due to the strain of the interface between metal and dielectric are suppressed with an amorphous composite metal oxide thin-film obtained by forming an amorphous dielectric made of an oxide of Ba and/or Sr and Ti on copper foil provided with a metal thin-film containing one or more selected from the group consisting of Cr, Mi, Au, and Ag and insulating properties are thereby ensured. In this document, it can be confirmed that the relative permittivity on a level with a yield of more than 80% is 12.2 to 19.9 as determined by calculation.

NON-PATENT DOCUMENT

Non-Patent Document 1: Science direct Physica B 348 (2004) 440-445, Preparation and characterisation of sol-gel derived $CaZrO_3$ dielectric thin film for high-k applications.

PATENT DOCUMENT

Patent Document 1: JP-A-2008-258555

However, techniques disclosed in Non-Patent Document 1 and Patent Document 1 are insufficient in relative permittivity and cannot cope with requirements such as the downsizing and sophistication of electronic components.

SUMMARY OP THE INVENTION

The present invention has been made in view of the above circumstances. It is an object of the present invention to provide a dielectric composition having high dielectric strength and relative permittivity even in the case of forming a dielectric film with reduced thickness and an electronic component containing the dielectric composition.

In order to achieve the above object, a dielectric composition according to the present invention contains major components that are an A-group containing major components that are at least two selected from the group consisting of Ba, Ca, and Sr and a B-group which contains a major component that is selected from Zr and Ti and which contains at least Zr. The dielectric composition contains an amorphous substance containing the A-group and the B-group and a crystalline substance containing the A-group and the B-group. The inequality $0.5 \leq \alpha \leq 1.5$ holds, where $\alpha$ is the molar ratio of the A-group to the B-group in the dielectric composition.

In a preferred embodiment of the present invention, an X-ray diffraction pattern obtained from the dielectric composition using Cu Kα radiation preferably has a peak which is observed in a 2θ range of 30° to 32° and which has a full width at half maximum of 0.15° to 0.50°.

A dielectric composition according to the present invention contains major components that are an A-group containing major components that are at least two selected from the group consisting of Ba, Ca, and Sr and a B-group which contains a major component that is selected from Zr and Ti and which contains at least Zr. An X-ray diffraction pattern obtained from the dielectric composition using Cu Kα radiation has a peak observed in a 2θ range of 30° to 32° has a full width at half maximum of 0.15° to 0.50° and the inequality $0.5 \leq \alpha \leq 1.5$ holds, where $\alpha$ is the molar ratio of the A-group to the B-group in the dielectric composition.

Furthermore, in a preferred embodiment of the present invention, the inequality $0 < w \leq 60$ preferably holds, where w is the proportion, in mole percent, of Ti to Zr in the B-group.

The use of each dielectric composition according to the present invention can achieve sufficiently high dielectric strength as compared to conventional dielectric compositions for use in high-frequency electronic components and can provide an electronic component, such as a dielectric resonator or a dielectric filter, exhibiting high relative permittivity, that is, higher S/N ratio even if being downsized.

In the present invention, a dielectric composition and an electronic component containing the dielectric composition can be provided. The dielectric composition contains such an amorphous substance and crystalline substance as described above. The electronic component has high dielectric strength and high relative permittivity even if a dielectric film is further reduced in thickness.

DESCRIPTION OF THE PREFERRED EMBODIMENTS

Embodiments of the present invention will now be described with reference to the accompanying drawings.

(Thin-Film Capacitor 10)

Figure 1:
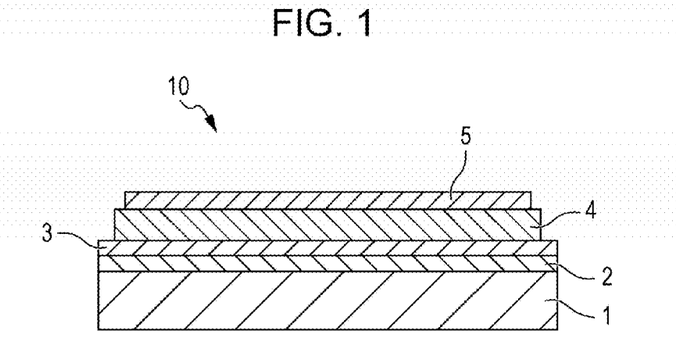
FIG. 1 is a sectional view of a thin-film capacitor according to an embodiment of the present invention.

FIG. 1 is a sectional view of a thin-film capacitor 10 according to an embodiment of the present invention. The thin-film capacitor 10 includes a supporting substrate 1, a lower electrode 3 deposited on or above a surface of the supporting substrate 1, an upper electrode 5, and a dielectric film 4 placed between the lower electrode 3 and the upper electrode 5. A ground layer 2 for increasing the adhesion between the supporting substrate 1 and the lower electrode 3 may be interposed between the supporting substrate 1 and the lower electrode 3. The supporting substrate 1 has the function of ensuring the mechanical strength of the whole thin-film capacitor 10.

The shape of the thin-film capacitor 10 is not particularly limited and is usually a rectangular parallelepiped shape. Dimensions of the thin-film capacitor 10 are not particularly limited. The thickness and length of the thin-film capacitor 10 may be adjusted to appropriate sizes depending on applications.

(Supporting Substrate 1)

A material for forming the supporting substrate 1, which is shown in FIG. 1, is not particularly limited. The supporting substrate 1 can be formed from single-crystalline materials such as single-crystalline Si, single-crystalline SiGe, single-crystalline GaAs, single-crystalline InP, single-crystalline SrTiO₃, single-crystalline MgO, single-crystalline LaAlO₃, single-crystalline ZrO₂, single-crystalline MgAl₂O₄, and single-crystalline NdGaO₃; polycrystalline ceramics such as polycrystalline Al₂O₃, polycrystalline ZnO, and polycrystalline SiCO₂; metals such as Ni, Cu, Ti, W, Mo, Al, and Pt; and alloys of these metals. The material for forming the supporting substrate 1 is not limited to these materials. In particular, single-crystalline Si is preferably used to form the supporting substrate 1 from the viewpoint of low cost and workability. The resistivity of the supporting substrate 1 varies depending on the material for forming the supporting substrate 1. In the case of using a material with low resistivity to form the supporting substrate 1, the leakage of a current to the supporting substrate 1 may possibly affect electrical characteristics of the thin-film capacitor 10. Therefore, the supporting substrate 1 is surface-insulated in some cases such that no current flows into the supporting substrate 1 during usage. When the supporting substrate 1 is made of, for example, single-crystalline Si, a surface portion of the supporting substrate 1 may be oxidised into an SiO₂ insulating layer or a layer of an insulator such as Al₂O₃, SiO₂, or Si₃N$_x$ may be formed on a surface of the supporting substrate 1. The thickness of the insulating layer is not particularly limited and is preferably 10 nm or more such that the insulation of the supporting substrate 1 is ensured. When the thickness of the insulating layer is less than 10 nm, the insulation of the supporting substrate 1 is not ensured. This is not preferred.

The thickness of the supporting substrate 1 is not particularly limited and is set to, for example, 10 μm to 5,000 μm such that the mechanical strength of the whole thin-film capacitor 10 is ensured. When the thickness of the supporting substrate 1 is less than 10 μm, the mechanical strength of the thin-film capacitor 10 cannot be ensured. When the thickness of the supporting substrate 1 is more than 5,000 μm, there is a problem in that the thin-film capacitor 10 cannot contribute to the downsizing of electronic components.

(Ground Layer 2)

In the present invention, the thin-film capacitor 10 preferably includes the ground layer 2, which is placed on a surface of the insulated supporting substrate 1 as shown in FIG. 1. The ground layer 2 is interposed between the supporting substrate 1 and the lower electrode 3 so as to increase the adhesion therebetween. When the lower electrode 3 is made of, for example, Cu or Pt, the ground layer 2 is commonly made of Cr or Ti, respectively. Since the ground layer 2 is intended to increase the adhesion between the supporting substrate 1 and the lower electrode 3, a material for forming the ground layer 2 is not limited to Cr or Ti. If the adhesion between the supporting substrate 1 and the lower electrode 3 can be ensured, the ground layer 2 may be omitted.

(Lower Electrode 3)

A material for forming the lower electrode 3 may be conductive. The lower electrode 3 can be formed from metals such as Pt, Ru, Rh, Pd, Ir, Au, Ag, Cu, and Ni; alloys of these metals; and conductive oxides. Therefore, the material for forming the lower electrode 3 may be selected depending on cost or an atmosphere used to heat-treat the dielectric film 4. The dielectric film 4 can be heat-treated using an inert gas such as N₂ or Ar, O₂, or a gas mixture of the inert gas and a reducing gas such as H₂. The lower electrode 3 preferably has a thickness of 10 nm or more so as to function as an electrode. When the thickness of the lower electrode 3 is less than 10 nm, the conductivity thereof is poor. This is not preferred. When the supporting substrate 1 is made of Cu, Ni, Pt, or a conductive oxide material that can be used to form an electrode, the ground layer 2 and the lower electrode 3 can be omitted.

After being formed, the lower electrode 3 may be heat-treated such that the adhesion between the ground layer 2 and the lower electrode 3 is increased and the stability of the lower electrode 3 is increased. In the ease of heat-treating the lower electrode 3, the heating rate of the lower electrode 3 is preferably 10° C./minute to 2,000° C./minute and more preferably 100° C./minute to 1,000° C./minute. The holding temperature of the lower electrode 3 during heat treatment is preferably 400° C. to 800° C. and the holding time thereof is preferably 0.1 hours to 4 hours. When the holding temperature or time thereof is outside the above range, an adhesion failure occurs or a surface of the lower electrode 3 is rendered irregular; hence, dielectric characteristics of the dielectric film 4 are likely to be reduced.

(Dielectric Film 4)

The dielectric film 4 is made of a dielectric composition according to an embodiment of the present invention. The dielectric composition contains major components that are an A-group containing major components that are at least two selected from the group consisting of Ba, Ca, and Sr and a B-group which contains a major component that is selected from Zr and Ti and which contains at least Zr. The dielectric composition contains an amorphous substance containing the A-group and the B-group and a crystalline substance containing the A-group and the B-group. In the dielectric composition, the inequality 0.5≤α≤1.5 holds, where α is the molar ratio of the A-group to the B-group.

The A-group may possibly contain a minor component such as a bivalent element. The A-group may contain a trace amount of an impurity or minor component that does not significantly reduce dielectric characteristics that are effects of the present invention, that is, relative permittivity and dielectric strength. Thus, the sum of the contents of the major components in the A-group is not particularly limited and is preferably, for example, 50% to 100%.

The B-group may possibly contain a minor component such as a tetravalent element. The B-group may contain a trace amount of an impurity or minor component that does not significantly reduce dielectric characteristics that are effects of the present invention, that is, relative permittivity and dielectric strength. Thus, the content of the major component in the B-group is not particularly limited and is preferably, for example, 50% to 100%.

In general, the amorphous substance forms clusters that become crystal nuclei. Long-period arrangements of the clusters are formed by heat treatment and grow into the crystalline substance. In the scope of this embodiment, the clusters, which become crystal nuclei, begin to grow and the crystalline substance is thought to be contained. Relative permittivity can be increased by increasing the proportion of the present crystalline substance. On the other hand, when the dielectric film 4 is a fully crystallized polycrystalline film, an electric field concentrates on a grain boundary to reduce the dielectric strength thereof. In this embodiment, the amorphous substance and the crystalline substance are in a mixed state and therefore high dielectric strength and high relative permittivity can probably be achieved.

Figure 2:
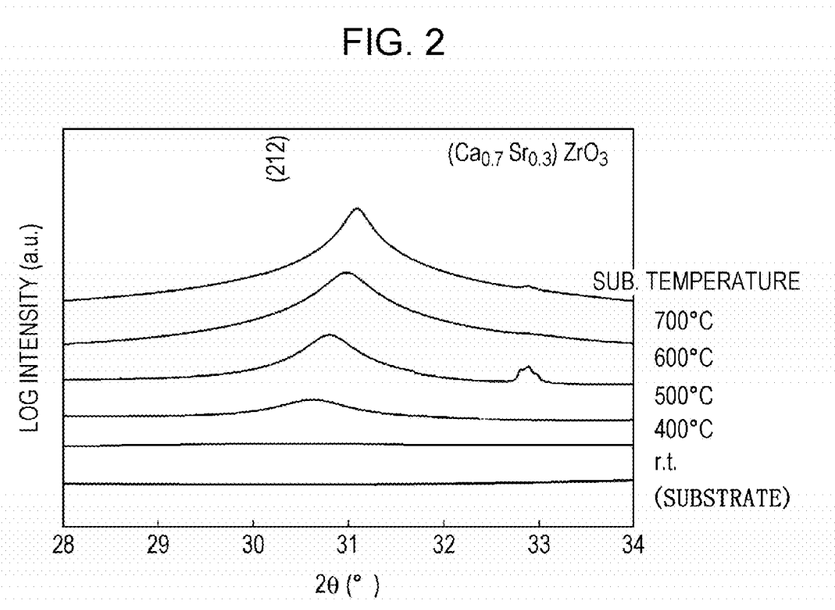
FIG. 2 is a graph showing an X-ray diffraction pattern of a lower electrode (Pt) formed on an Si single-crystalline supporting substrate equipped with an SiO₂ insulating film and an X-ray diffraction pattern of a dielectric film formed thereon.

An example of a technique for confirming the mixed state of the amorphous substance and the crystalline substance is an X-ray diffraction technique. In particular, in the case of measurement using Cu Kα radiation as shown in FIG. 2, an X-ray diffraction pattern having a main peak which is observed at 30° to 32° and which has a full width at half maximum of more than 0.50° is judged to be a fully amorphous substance, an X-ray diffraction pattern having a main peak which is observed at 30° to 32° and which has a full width at half maximum of less than 0.15° is judged to be a fully crystalline substance, and an X-ray diffraction pattern having a main peak which is observed at 30° to 32° and which has a full width at half maximum of 0.15° to 0.50° is judged to be a mixture of the amorphous substance and the crystalline substance that can achieve effects of this embodiment.

In a fully amorphous film, crystal symmetry sufficient to cause polarization is not achieved and therefore an increase in relative permittivity cannot be expected. In a crystalline film containing no crystalline substance, breakdown is likely to occur at grain boundaries or the like because of the microstructure thereof and therefore sufficient dielectric strength cannot be achieved. From the above, effects of this embodiment can be achieved using the dielectric composition because the dielectric composition contains the amorphous substance, which contains the A-group and the B-group, and the crystalline substance, which contains the A-group and the B-group.

The A-group contains at least two selected from the group consisting of Ba, Sr, and Ca and therefore the effect of an increase in dielectric strength can be achieved as compared to the case where the A-group contains one selected from the group consisting of Ba, Ca, and Sr. This is probably because an effect similar to a mixed-alkali effect due to the presence of two types or more of monovalent alkali metal ions is achieved because at least two types of bivalent alkaline-earth metal ions are co-present.

The dielectric film 4 preferably satisfies the inequality 0<w<60, where w is the proportion, in mole percent, of Ti to Zr in the B-group.

When the B-group contains Zr and Ti and the abundance ratio of Ti in the B-group is within the above range, an oxygen octahedron in the crystalline substance contains Ti, which is smaller in ionic radius than Zr. This increases the polarization of a B-site and therefore effects of this embodiment can be enhanced. When the proportion of Ti to Zr in the B-group is more than 60 mole percent, effects of this embodiment are not further enhanced.

The dielectric film 4 preferably has a thickness of 10 nm to 2,000 nm and more preferably 50 nm to 1,000 nm. When the thickness of the dielectric film 4 is less than 10 nm, a current is likely to leak. When the thickness of the dielectric film 4 is more than 2,000 nm, the area of electrodes needs to be large in order to allow a capacitor to have increased capacitance. This cannot contribute to the downsizing of electronic components and therefore is not preferred. The thickness of the dielectric film 4 may be measured in such a manner that the dielectric film 4 is milled with a focused ion beam (FIB) processor and an obtained cross section is observed with a scanning ion microscope (SIM) or the like and is measured for length.

The dielectric film 4 can be formed by various thin-film forming processes such as a vacuum evaporation process, a sputtering process, a pulsed laser deposition (PLD) process, a metal-organic chemical vapor deposition (MOCVD) process, a metal-organic decomposition (MOD) process, a sol-gel process, and a chemical solution deposition (CSD) process. Raw materials (evaporation materials, various target materials, and metal-organic materials) contain trace amounts of impurities in some cases. If the impurities do not significantly reduce insulating properties, the impurities are not particularly problematic.

The dielectric film 4 is formed in such a manner that the supporting substrate 1 is being heated, whereby the amorphous substance, which contains the A-group and the B-group, is partly crystallized.

The holding temperature of the supporting substrate 1 during heating is preferably 200° C. to 600° C. and more preferably 300° C. to 600° C. When the holding temperature thereof is lower than 200° C., no sufficient crystalline substance is obtained and the relative permittivity cannot be increased. When the holding temperature thereof is higher than 600° C., crystallization proceeds and no amorphous substance remains; hence, a reduction in dielectric strength is likely to occur.

The dielectric composition may contain a trace amount of an impurity or minor component that does not significantly reduce dielectric characteristics that are effects of the present invention, that is, relative permittivity and dielectric strength. Thus, the sum of the contents of the major components in the dielectric composition is not particularly limited and is preferably, for example, 50% to 100%, the major components being the A-group and the B-group.

The dielectric film 4 is usually made of the dielectric composition only and may have a multilayer structure containing another dielectric composition. In order to adjust the impedance or temperature characteristics of the dielectric film 4, for example, existing $Si_3N_x$, $SiO_x$, $Al_2O_x$, $ZrO_x$, or $Ta_2O_x$ amorphous dielectric films and crystalline films are stacked into a multilayer structure. This allows other characteristics to be adjusted with dielectric strength maintained.

(Upper Electrode 5)

In this embodiment, the thin-film capacitor 10 includes the upper electrode 5, which is placed on a surface of the dielectric film 4 and functions as another electrode of the thin-film capacitor 10. A material for forming the upper electrode 5 is not particularly limited and may be conductive. The upper electrode 5 can be formed from a material similar to the material for forming the lower electrode 3. The upper electrode 5 preferably has a thickness of 10 nm or more so as to function as an electrode. When the thickness of the upper electrode 5 is less than 10 nm, the conductivity thereof is poor. This is not preferred for the upper electrode 5.

In the above embodiment, the thin-film capacitor 10 is exemplified as an electronic component according to the present invention. The electronic component is not limited to the thin-film capacitor 10 and may be an electronic component, such as a balun, a coupler, or a band-pass filter, including a dielectric film.

EXAMPLES

The present invention further described below in detail with reference to examples. The present invention is not limited to the examples.

Example 1

Comparative Example 1

First, a ground layer, that is, a Ti thin-film was formed on a surface of a 10 mm square supporting substrate including a 350 μm thick Si portion and a 6 μm thick $SiO_2$ insulating film placed, thereon by a sputtering process so as to have a thickness of 20 nm.

Next, a lower electrode, that is, a Pt thin-film was formed on the Ti thin-film formed as described above by a sputtering process so as to have a thickness of 100 nm.

The formed Ti and Pt thin-films were heat-treated in an oxygen atmosphere at atmospheric pressure under the following conditions: a heating rate of 400° C./minute, a holding temperature of 700° C., and a temperature-holding time of 30 minutes.

A PLD process was used to form a dielectric film. Targets necessary to form the dielectric film were prepared as described below.

Raw materials were prepared in such a manner that $BaCO_3$, $CaCO_3$, $SrCO_3$, and $ZrCo_2$ were weighed such that the proportions of the amounts of Ba, Ca, and Sr and the molar ratio α of an A-group to a B-group in each of Samples 1 to 14 were as shown in Table 1.

TABLE 1

| | | Composition | | | | | | | | | |
|---|---|---|---|---|---|---|---|---|---|---|---|
| | | A-group | | | B-group | | | Full width | | | Relative |
| | Samples No. | Ba mol % | Ca mol % | Sr mol % | Zr 1-w mol % | Ti w mol % | α | at half maximum (°) | Amorphous substance | Crystalline substance | Dielectric strength (MV/cm) | permittivity εr (-) |
| Example 1 | 1 | 0 | 50 | 50 | 100 | 0 | 1.00 | 0.37 | P | P | 5.7 | 31 |
| | 2 | 50 | 50 | 0 | 100 | 0 | 1.00 | 0.38 | P | P | 5.8 | 32 |
| | 3 | 50 | 0 | 50 | 100 | 0 | 1.00 | 0.41 | P | P | 5.8 | 34 |
| | 4 | 0 | 90 | 10 | 100 | 0 | 1.00 | 0.35 | P | P | 5.5 | 30 |
| | 5 | 0 | 10 | 90 | 100 | 0 | 1.00 | 0.37 | P | P | 5.4 | 31 |
| | 6 | 10 | 90 | 0 | 100 | 0 | 1.00 | 0.35 | P | P | 5.6 | 30 |
| | 7 | 90 | 0 | 10 | 100 | 0 | 1.00 | 0.42 | P | P | 5.5 | 34 |
| | 8 | 90 | 10 | 0 | 100 | 0 | 1.00 | 0.42 | P | P | 5.4 | 34 |
| | 9 | 10 | 0 | 90 | 100 | 0 | 1.00 | 0.38 | P | P | 5.4 | 32 |
| | 10 | 30 | 35 | 35 | 100 | 0 | 1.00 | 0.38 | P | P | 5.7 | 32 |
| | 11 | 0 | 70 | 30 | 100 | 0 | 1.00 | 0.35 | P | P | 5.9 | 32 |
| Comparative Example 1 | 12 | 0 | 100 | 0 | 100 | 0 | 1.00 | 0.37 | P | P | 3.8 | 31 |
| | 13 | 100 | 0 | 0 | 100 | 0 | 1.00 | 0.49 | P | P | 3.8 | 38 |
| | 14 | 0 | 0 | 100 | 100 | 0 | 1.00 | 0.42 | P | P | 4.0 | 34 |

Next, the raw materials prepared as described above, water, and zirconia beads with a diameter of 2 mm were put in a bail mill and were wet-mixed together for 20 hours, whereby mixed powder slurry was obtained. The mixed powder slurry was dried at 100° C. for 20 hours, whereby mixed powder was obtained.

The mixed powder and polyvinyl alcohol (PVA) were put in a mortar and were prepared into granular powder using a pestle, the amount of PVA being 10% by weight of the mixed powder. The granular powder was put in a mold with a diameter of 20 mm so as to form a layer with a thickness of about 5 mm and was then formed into a molded body using a uniaxial hydraulic press. Molding conditions were a pressure of $2.0 \times 10^8$ Pa, a temperature around room temperature, and the like. The obtained molded body was degreased and fired under conditions below.

Degreasing conditions were a heating rate of 100° C./h, a holding temperature of 400° C., a temperature-holding time of 4 hours, and the like. An atmosphere used to degrease the molded body was atmospheric pressure air.

Firing conditions were a heating rate of 200° C./h, a holding temperature of 1,200° C. to 1,300° C., a temperature-holding time of 4 hours, and the like. An atmosphere used to fire the molded body was atmospheric pressure air.

Next, both surfaces of a sintered body obtained by degreasing and firing the molded body was polished with a cylindrical polisher such that the thickness of the sintered body was reduced to 4 mm, whereby a PLD target necessary to form a dielectric film was obtained.

The dielectric film was formed on the lower electrode by a PLD process using the PLD target so as to have a thickness of 400 nm. Conditions for forming the dielectric film by the PLD process were an oxygen pressure of $1 \times 10^{-2}$ Pa, a substrate temperature of 400° C., and the like. A region not covered by the dielectric film was formed using a metal mask such that the lower electrode was partly exposed through the region.

The thickness of the dielectric film was measured in such a manner that the dielectric film was milled with an FIB and an obtained cross section was observed with an SIM and was measured for length.

The composition of the dielectric film, was measured by X-ray fluorescence (XRF) spectrophotometry. It was confirmed that ail samples had compositions shown in Tables 1 to 4.

Next, an upper electrode, that is, a Pt electrode was formed on the dielectric film using a sputtering system. A processed metal mask was used to form the Pt electrode such that the Pt electrode had a diameter of 5 mm and a thickness of 200 nm. Samples 1 to 14 were prepared by the above procedure so as to have a structure shown in FIG. 1. The thickness of the Pt electrode was measured in such a manner that the dielectric film was milled with an FIB and an obtained cross section was observed with an SIM and was measured for length.

Samples 1 to 14 were measured for dielectric strength and relative permittivity by methods below.

(Dielectric Strength)

The dielectric strength of each sample was measured in such a manner that a digital ultra-high resistance/micro current meter (ADVANTEST R8340) was connected between the upper electrode the region where the lower electrode was exposed, the resistance was measured while a voltage was being applied in steps of 5 V/s, the voltage was read when the measured resistance dropped by two orders of magnitude from the initial voltage, the read voltage was defined as the breakdown voltage (V) of the sample. A value obtained by dividing the determined breakdown voltage (V) was defined as the dielectric strength (MV/cm) and was specified in Table 1. A dielectric strength of 5.0 MV/cm or more was rated good because higher dielectric strength was preferred.

(Relative Permittivity)

The relative permittivity (unitless) of each sample was calculated from the thickness of the dielectric film and the capacitance determined at a reference temperature of 25° C., a frequency of 1 MHz, and an input signal level (measured voltage) of 0.1 Vrms using a digital LCR meter (4274A, manufactured by YHP, Ltd.). A relative permittivity of 30 or more was rated good because higher relative permittivity was preferred.

(Confirmation of Crystal State of Dielectric Film)

Figure 3:
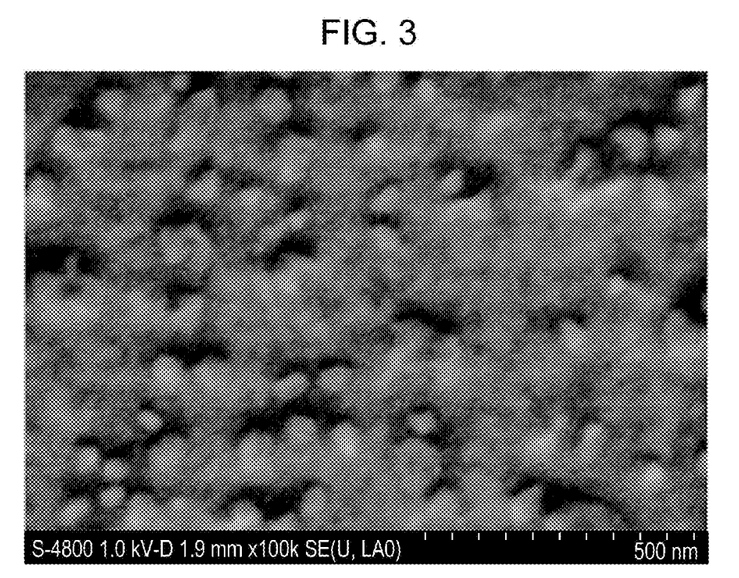
FIG. 3 is a photograph of a surface of a dielectric film observed with a scanning electron microscope (SEM), the dielectric film being formed on a substrate heated to 400° C.
Figure 4:
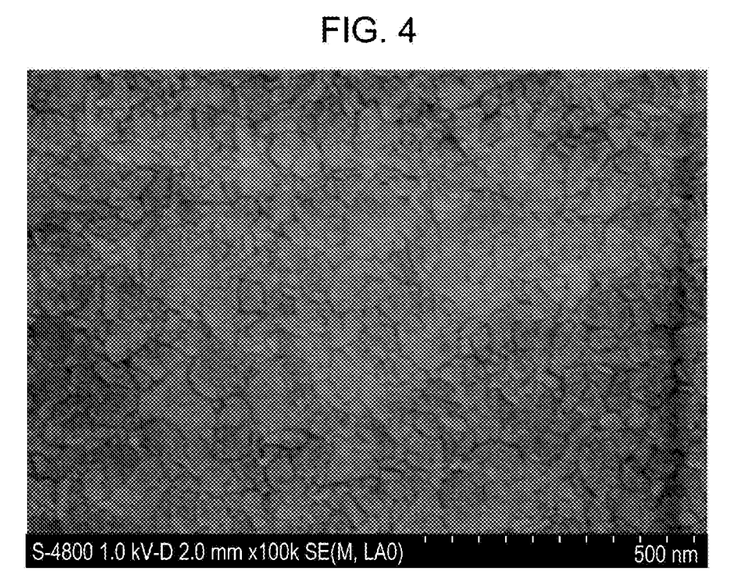
FIG. 4 is a photograph of a surface of a dielectric film observed with an SEM, the dielectric film being formed on a substrate heated to 700° C.

Each sample was measured by X-ray diffraction (XRD) and the dielectric film was observed with an SEM, whereby a fully crystalline substance, a fully amorphous substance, and a mixture of a crystalline substance and an amorphous substance were judged. An X-ray source used for XRD was Cu-Kα radiation. Measurement conditions for XRD were a voltage of 4.5 kV, a 2θ range of 20° to 50°, and the like. FIG. 2 shows a portion of an example of each obtained diffraction pattern. The abscissa represents the diffraction angle (2θ) and the ordinate represents the logarithm of arbitrary intensity. In FIG. 2, the bottom curve is a diffraction pattern obtained after a lower electrode was formed on a supporting substrate, the second curve from the bottom is a diffraction pattern obtained after an amorphous dielectric film was formed on a lower electrode, the third curve from the bottom is a diffraction pattern of a crystalline dielectric film formed on a lower electrode by heating at 400° C., the fourth curve from the bottom is a diffraction pattern of a crystalline dielectric film formed on a lower electrode by heating at 500° C., the fifth curve from the bottom is a diffraction pattern of a crystalline dielectric film formed on a lower electrode by heating at 600° C., and the top curve is a diffraction pattern of a crystalline dielectric film formed on a lower electrode by heating at 700° C. Diffraction peaks, observed at 30° to 32°, obtained by the crystallization of a dielectric material were fitted using a pseudo-Voigt function and all the samples were determined for full width at half maximum. A sample having no apparent peak and a sample having a full width at half maximum of more than 0.50° were judged to be fully amorphous. A sample having a full width at half maximum of less than 0.15° was judged to be fully crystalline. Furthermore, a surface of each dielectric film was observed with an SEM, whereby the crystal state thereof was confirmed. A sample in which no crystalline substance was capable of being confirmed as shown in FIG. 3 or 4 was judged to be fully amorphous. A sample which was entirely crystalline as shown in FIG. 4 was judged to be fully crystalline. The presence of an amorphous substance and a crystalline substance was judged from a combination of results of XRD and results of SEM. In Tables 1 to 5, the presence and absence of the amorphous substance or the crystalline substance were denoted by "P" and "–", respectively.

Samples 1 to 11

From Table 1, it can foe confirmed that when a dielectric composition contains major components that are an A-group containing major components that are at least two selected from the group consisting of Ba, Ca, and Sr and a B-group which contains at least Zr and which contains a major component that is selected from Zr and Ti and also contains an amorphous substance containing the A-group and the S-group and a crystalline substance containing the A-group and the B-group and the inequality 0.5≤α≤1.5 holds a being the molar ratio of the A-group to the B-group, the dielectric strength is 5.0 MV/cm or more and the relative permittivity is 30 or more.

Samples 12 to 14

From Table 1, it can be confirmed that when a dielectric composition contains an amorphous substance containing an A-group and a B-group and a crystalline substance containing the A-group and the B-group and the A-group is of one species, the dielectric strength is less than 5.0 MV/cm. Therefore, it can be confirmed that the A-group needs to contain at least two of Ba, Ca, and Sr.

Example 2

Comparative Example 2

BaCO$_3$, CaCO$_3$, SrCO$_3$, ZrO$_2$, and TiO$_2$ were weighed such that the proportions of the amounts of Ba, Ca, and Sr and the molar ratio α of an A-group to a B-group in each of Samples 15 to 20 were as shown in Table 2, followed by preparing targets. Samples 15 to 20 were prepared by substantially the same procedure as that described in Example 1 except the composition of the targets and were evaluated by the same methods as those described in Example 1. Results are shown in Table 2.

TABLE 2

| | Samples No. | Composition | | | | | α | Full width at half maximum (°) | Amorphous substance | Crystalline substance | Dielectric strength (MV/cm) | Relative permittivity εr (-) |
|---|---|---|---|---|---|---|---|---|---|---|---|---|
| | | A-group | | | B-group | | | | | | | |
| | | Ba mol % | Ca mol % | Sr mol % | Zr 1-w mol % | Ti w mol % | | | | | | |
| Example 2 | 15 | 0 | 70 | 30 | 100 | 0 | 0.50 | 0.41 | P | P | 5.5 | 34 |
| | 16 | 0 | 70 | 30 | 100 | 0 | 0.80 | 0.38 | P | P | 5.7 | 33 |
| | 11 | 0 | 70 | 30 | 100 | 0 | 1.00 | 0.35 | P | P | 5.9 | 32 |
| | 17 | 0 | 70 | 30 | 100 | 0 | 1.20 | 0.39 | P | P | 5.8 | 32 |
| | 18 | 0 | 70 | 30 | 100 | 0 | 1.50 | 0.43 | P | P | 5.8 | 31 |
| Comparative Example 2 | 19 | 0 | 70 | 30 | 100 | 0 | 0.40 | — | P | — | 1.8 | 18 |
| | 20 | 0 | 70 | 30 | 100 | 0 | 1.60 | 0.42 | P | P | Unmeasurable | Unmeasurable |

Samples 11 and 15 to 18

From Table 2, it can be confirmed that when the molar ratio α of an A-group to a B-group is within the range 0.5≤α≤1.5 and an amorphous substance and a crystalline substance are in a mixed state, the dielectric strength is 5.0 MV/cm or more and the relative permittivity is 30 or more.

Samples 19 to 20

As is clear from Table 2, no crystalline substance is obtained when the molar ratio α of an A-group to a B-group is less than 0.5 and electrical characteristics are immeasurable because of the occurrence of cracks when the molar ratio α of the A-group to the B-group is more than 1.5. Therefore, it can be confirmed that the molar ratio α of the A-group to the B-group needs to be within the range 0.5≤α≤1.5.

Example 3

Comparative Example 3

$BaCO_3$, $CaCO_3$, $SrCO_3$, $ZrO_2$, and $TiO_2$ were weighed such that the proportions of the amounts of Ba, Ca, and Sr and the molar ratio α of an A-group to a B-group in each of Samples 21 to 25 were as shown in Table 3, followed by preparing targets. Samples 21 to 25 were prepared by substantially the same procedure as that described in Example 1 except the composition of the targets and were evaluated by the same methods as those described in Example 1. Results are shown in Table 3.

A-group and a B-group and a crystalline substance containing the A-group and the B-group, the B-group contains Zr and Ti, the proportion (w) of Ti is greater than 0 mole percent and less than or equal to 60 mole percent, and the amorphous substance and the crystalline substance are in a mixed state, the relative permittivity is 35 or more and the dielectric strength is 5.0 MV/cm or more.

Sample 24

As is clear from Table 3, when a dielectric composition, contains an amorphous substance containing an A-group and a B-group and a crystalline substance containing the A-group and the B-group and the proportion (w) of Ti is greater than 60 mole percent, the relative permittivity is greater than or equal to 30 and less than 35.

Sample 25

As is clear from Table 3, when a dielectric composition contains an amorphous substance containing an A-group and a B-group and a crystalline substance containing the A-group and the B-group and the B-group contains no Zr, the dielectric strength is less than 5.0 MV/cm.

Example 4

Comparative Example 4

Samples 26 to 30 were prepared by substantially the same procedure as that described in Example 1 except that the temperature of a substrate of Sample 26, 27, 28, 29, or 30 during deposition was 500° C., 600° C., room temperature,

TABLE 3

| | Samples No. | Composition | | | | | α | Full width at half maximum (°) | Amorphous substance | Crystalline substance | Dielectric strength (MV/cm) | Relative permittivity εr (-) |
|---|---|---|---|---|---|---|---|---|---|---|---|---|
| | | A-group | | | B-group | | | | | | | |
| | | Ba mol % | Ca mol % | Sr mol % | Zr 1-w mol % | Ti w mol % | | | | | | |
| Example 3 | 21 | 0 | 70 | 30 | 40 | 60 | 1.00 | 0.28 | P | P | 5.2 | 41 |
| | 22 | 0 | 70 | 30 | 75 | 25 | 1.00 | 0.31 | P | P | 5.3 | 37 |
| | 23 | 0 | 70 | 30 | 95 | 5 | 1.00 | 0.34 | P | P | 5.7 | 36 |
| | 24 | 0 | 70 | 30 | 30 | 70 | 1.00 | 0.25 | P | P | 5.1 | 34 |
| Comparative Example 3 | 25 | 0 | 70 | 30 | 0 | 100 | 1.00 | 0.21 | P | P | 2.1 | 68 |

Samples 11 and 21 to 23

From Table 3, it can be confirmed that when a dielectric composition contains an amorphous substance containing an 300° C., or 700° C., respectively. Samples 26 to 30 were evaluated by the same methods as those described in Example 1. Results are shown in Table 4.

TABLE 4

| | Samples No. | Composition | | | | | α | Full width at half maximum (°) | Amorphous substance | Crystalline substance | Dielectric strength (MV/cm) | Relative permittivity εr (-) | Deposition temperature (° C.) |
|---|---|---|---|---|---|---|---|---|---|---|---|---|---|
| | | A-group | | | B-group | | | | | | | | |
| | | Ba mol % | Ca mol % | Sr mol % | Zr 1-w mol % | Ti w mol % | | | | | | | |
| Example 4 | 11 | 0 | 70 | 30 | 100 | 0 | 1.00 | 0.35 | P | P | 5.9 | 32 | 400 |
| | 26 | 0 | 70 | 30 | 100 | 0 | 1.00 | 0.20 | P | P | 5.6 | 34 | 500 |
| | 27 | 0 | 70 | 30 | 100 | 0 | 1.00 | 0.17 | P | P | 5.3 | 34 | 600 |
| Comparative Example 4 | 28 | 0 | 70 | 30 | 100 | 0 | 1.00 | — | P | — | 6.0 | 17 | Room temperature |
| | 29 | 0 | 70 | 30 | 100 | 0 | 1.00 | 0.52 | P | — | 5.9 | 19 | 300 |
| | 30 | 0 | 70 | 30 | 100 | 0 | 1.00 | 0.14 | — | P | Un-measurable | Un-measurable | 700 |

Samples 11, 26, and 27

From Table 4, it can be confirmed that when the full width at half maximum of a diffraction peat observed at 30° to 32° by XRD ranges from 0.15° to 0.50° and an amorphous substance and a crystalline substance are in a mixed state, a relative permittivity of 30 or more and a dielectric strength of 5.0 MV/cm or more, that is, a relative permittivity and dielectric strength higher than those of a film made of an amorphous substance as disclosed in related art are achieved.

Samples 28 to 30

As is clear from Table 4, in the case of not heating a substrate, no diffraction peak is observed by XRD, that is, no crystalline substance is present and the relative permittivity is less than 30. When the temperature of a substrate is lower than 400° C., the full width at half maximum of a diffraction peak observed at 31.5° by XRD is more than 0.50°, any sufficient crystalline substance is present, and the relative permittivity is less than 30. Furthermore, when the temperature of a substrate is higher than 600° C., the full width at half maximum of a diffraction peak observed at 31° to 32° by XRD is less than 0.15°, no amorphous substance is present, no electrical characteristics are determined because of cracks.

Example 5

Sample 31 was prepared by substantially the same procedure as that described in Example 1 except that a dielectric film was formed by a sputtering process. Sample 31 was evaluated by the same methods as those described in Example 1. Results are shown in Table 5.

Example 6

Sample 32 was prepared by substantially the same procedure as that described in Example 1 except that the holding temperature of a dielectric film during post-deposition heat treatment was 600° C. Sample 32 was evaluated by the same methods as those described in Example 1, Results are shown in Table 5.

Example 7

A substrate of a thin-film capacitor was prepared from Cu foil with a thickness of 100 μm. A dielectric film was formed on the substrate by the same method as that described in Example 1.

The dielectric film was heat-treated at an oxygen partial pressure of $10^{-8}$ Pa using a mixture of an inert gas, $N_2$, and a reducing gas, $H_2$. Sample 33 was prepared in such a manner that the heating rate, holding temperature, and holding time of the dielectric film were the same as the conditions described in Example 1. Sample 33 was evaluated by the same methods as those described in Example 1. Results are shown in Table 5.

Example 8

Sample 34 was prepared by substantially the same procedure as that described in Example 1 except that the thickness of a dielectric film used was 800 nm. Sample 34 was evaluated by the same methods as those described in Example 1. Results are shown in Table 5.

TABLE 5

| Examples | Samples No. | Composition | | | | | α | Full width at half maximum (°) | Amorphous substance | Crystalline substance | Dielectric strength (MV/cm) | Relative permittivity εr (-) | Remarks |
|---|---|---|---|---|---|---|---|---|---|---|---|---|---|
| | | A-group | | | B-group | | | | | | | | |
| | | Ba mol % | Ca mol % | Sr mol % | Zr 1-w mol % | Ti w mol % | | | | | | | |
| 5 | 31 | 0 | 70 | 30 | 100 | 0 | 1.00 | 0.35 | P | P | 5.8 | 31 | Deposition: sputtering |
| 6 | 32 | 0 | 70 | 30 | 100 | 0 | 1.00 | 0.37 | P | P | 6.0 | 32 | Post-deposition heat treatment at 600° C. |
| 7 | 33 | 0 | 70 | 30 | 100 | 0 | 1.00 | 0.33 | P | P | 5.2 | 33 | Substrate: 100 μm thick Cu foil |

TABLE 5-continued

| Examples | Samples No. | Composition | | | | | α | Full width at half maximum (°) | Amorphous substance | Crystalline substance | Dielectric strength (MV/cm) | Relative permittivity εr (-) | Remarks |
|---|---|---|---|---|---|---|---|---|---|---|---|---|---|
| | | A-group | | | B-group | | | | | | | | |
| | | Ba mol % | Ca mol % | Sr mol % | Zr 1-w mol % | Ti w mol % | | | | | | | |
| 8 | 34 | 0 | 70 | 30 | 100 | 0 | 1.00 | 0.36 | P | P | 6.1 | 31 | Dielectric film thickeness: 800 μm |

Samples 31 to 34

From Table 5, it can be confirmed that when a dielectric film is made of a dielectric composition that contains major components that are an A-group containing major components that are at least two selected from the group consisting of Ba, Ca, and Sr and a B-group which contains at least Zr and which contains a major component that is selected from Zr and. Ti, the dielectric composition containing an amorphous substance containing the A-group and the B-group and a crystalline substance containing the A-group and the B-group, the dielectric strength is 5.0 MV/cm or more and the relative permittivity is 30 or more, even though a method for preparing the dielectric film (Sample 31), conditions for heat-treating the dielectric film (Sample 32), the type of a substrate (Sample 33), and the thickness of the dielectric film (Sample 34) are different from others.

As described above, the present invention relates to a dielectric composition and an electronic component. The present invention can increases the relative permittivity of a dielectric without reducing the dielectric strength thereof. This enables the downsizing and sophistication of an electronic component containing a dielectric composition. The present invention widely provides new technology for, for example, thin-film capacitors, high-frequency thin-film components, and the like containing a dielectric composition.

DESCRIPTION OF REFERENCE NUMERALS

1 Supporting substrate
2 Ground layer
3 Lower electrode
4 Dielectric film
5 Upper electrode
10 Thin-film capacitor

What is claimed is:

1. A dielectric composition consisting essentially of:
an A-group containing major components that are at least two selected from the group consisting of Ba, Ca, and Sr, and
a B-group which contains a major component that is selected from Zr and Ti and which contains at least Zr,
the dielectric composition containing an amorphous substance containing the A-group and the B-group and a crystalline substance containing the A-group and the B-group,
wherein:
the inequality $0.5 \leq \alpha \leq 1.5$ holds, where a is the molar ratio of the A-group to the B-group in the dielectric composition,
the B-group contains Ti in an amount of 0 to 25 mol% with respect to a total amount of Zr and Ti contained in the B-group, and
an X-ray diffraction pattern obtained from the dielectric composition using Cu Kα radiation has a peak which is observed in a 2θ range of 30° to 32° having a full width at half maximum of 0.31° to 0.50°, and
an electronic device containing a dielectric film formed from said dielectric composition has a dielectric strength of 5.0 MV/cm or more.

2. An electronic component containing the dielectric composition according to claim 1.

3. The dielectric composition according to claim 1, wherein said electronic device has a relative permittivity of 30 or more.

4. The dielectric composition according to claim 1, wherein the B-group contains Ti in an amount of greater than 0 and up to 25 mol% with respect to a total amount of Zr and Ti contained in the B-group.

* * * * *